United States Patent [19]
Hirata

[11] 3,791,724
[45] Feb. 12, 1974

[54] OVERLAP CONTROL DEVICE FOR A MOTION PICTURE CAMERA
[75] Inventor: Hiroshi Hirata, Sakai, Japan
[73] Assignee: Minolta Camera Kabushiki Kaisha, Osaka, Japan
[22] Filed: Oct. 16, 1972
[21] Appl. No.: 297,651

Related U.S. Application Data
[63] Continuation of Ser. No. 66,411, Aug. 24, 1970, abandoned.

[30] Foreign Application Priority Data
Aug. 25, 1969 Japan.............................. 44-66462

[52] U.S. Cl. ............................................. 352/91
[51] Int. Cl. ......................................... G03b 21/36
[58] Field of Search ...................................... 352/91

[56] References Cited
UNITED STATES PATENTS
3,730,614  5/1973  Hirata................................ 352/91

Primary Examiner—Joseph F. Peters
Assistant Examiner—Russell E. Adams, Jr.
Attorney, Agent, or Firm—Watson, Cole, Grindle & Watson

[57] ABSTRACT

First and second circuits for energizing a motor in a normal and a reverse direction to drive film for controlling fade-in and fade-out photography are actuated by a change-over switch which is set by a first manual member at either a normal or fade-in, fade-out photographic positions which respectively select either said first or second energizing circuit. The second energizing circuit includes a switch contact which is closed or opened in accordance with the position of a second manual settable member. The shutter blade mechanism includes a control member for decreasing and increasing the opening thereof. A transmission mechanism is controlled in accordance with the position of the first manually settable member to change the direction of film winding.

3 Claims, 4 Drawing Figures

3,791,724

OVERLAP CONTROL DEVICE FOR A MOTION PICTURE CAMERA

This is a continuation, of application Ser. No. 66,411, filed Aug. 24, 1970, now abandoned.

BACKGROUND OF THE INVENTION

The present invention relates to a trick photograph device for a movie camera.

In known movie camera devices, when taking an overlap photo-graph, and in carrying out a fade-in photograph, the rewinding of the film, and in taking a fade-out photograph, the respective operations are accomplished by selecting a given film length in reliance upon the picture frame number of the film. The photographic operations are then carried out so as to correspond with the picture frame number, so that it is difficult for only one operater to do all the necessary operations while viewing the object in the viewfinder, and trick photography is especially difficult with a small-sized movie camera of the portable type.

Whereas, in a co-pending application, Ser. No. 57,537, filed July 23, 1970, in which the normal photograph and the overlap photograph can be changed over easily, and the changing over between the overlap photograph and the fade-out photograph selects a constant film length and the film rewinding of the same film length are automatically effected. The release operation causes the fade-in photograph to be exposed onto the same length of film as and the subsequent normal photograph also can be effected.

According to the aforementioned invention, the change over between the normal photograph and the overlap photograph can be automatically done, however, in that invention only the two kinds of photograph can be accomplished and it is impossible to do trick photograph photography including continuous fade-out and fade-in photography in addition to the overlap photography.

The primary object of the present invention is to provide a movie camera enabling automatic change over to trick photography including the normal photography, the overlap photography, and continuous fade-out and fade-in photography.

The second object of the present invention is to provide a movie camera enabling automatic change-over between overlap photography and continuous fade-out and fade-in photography by means of the setting of a change-over knob.

A feature of the present invention is that the movie camera has a power source circuit including a switch opened or closed in interlocking relationship with the movement of the change-over knob to effect operation of a motor reversing circuit. When overlap photography is selected by the change-over knob, the motor circuit is actuated to feed a constant film length and rewind the film continuously and the photographing is then stoped. When taking continuous fade-out and fade-in photography the motor circuit is opened and the photographing is stopped simultaneously with the finish of the fade-out photograph. Subsequently, by changing over to normal photography the fade-in photograph and the subsequent normal photograph are carried out.

DESCRIPTION OF A PREFERRED EMBODIMENT

Figure 1:
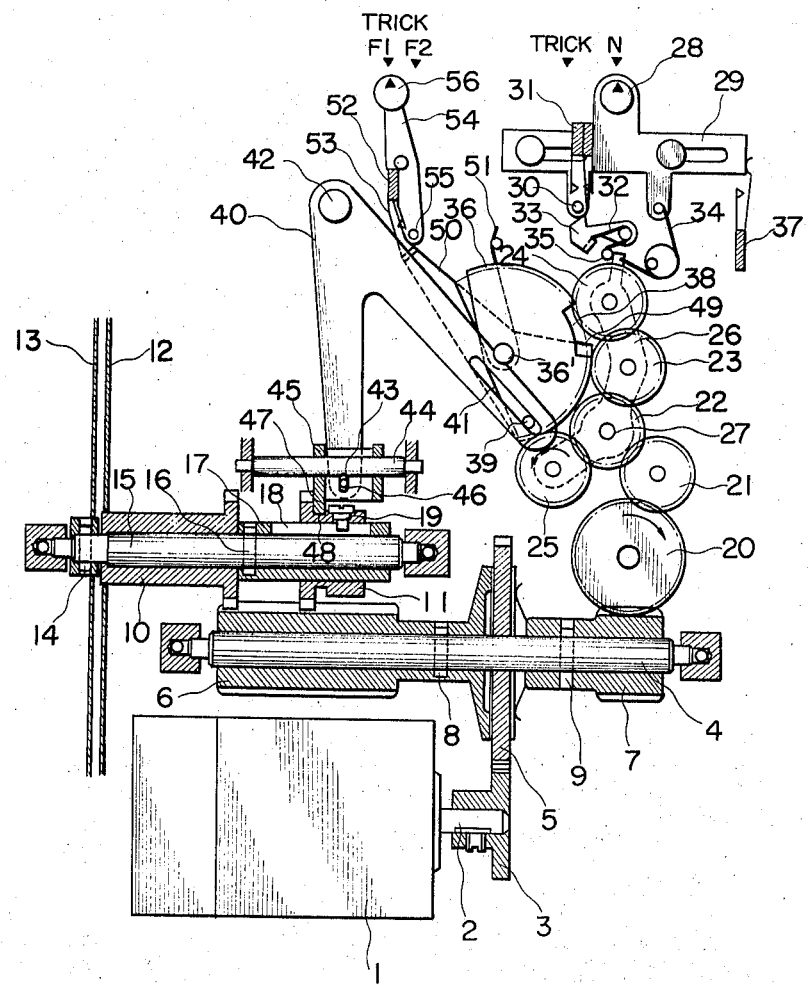
FIG. 1 is a partially cut away side view of the essential components of the mechanism showing the position of respective elements thereof for normal photography in accordance with the present invention.

Driving gear 3, mounted to motor shaft 2 of prime motor 1, meshes with gear 5 coupled frictionally to intermediate shaft 4. Shutter chain gear 6 and control chain gear 7 are respectively fixed by pins 8, 9 to intermediate shaft 4. Shutter chain gear 6 shutter blade 12 is fixed to sleeve 10 having a gear meshing with shutter chain gear 6, and cam ring 17 is fixed by pin 16 to main shaft 15 fitted rotatably within sleeve 10, and has cam slot 18 therein. Sleeve 11 is mounted slidably on cam ring 17 and cam pin 19 is inserted within sleeve 11. As shown in FIG. 1 another gear fixed to sleeve 11 also meshes with shutter chain gear 6. On the end of main shaft 15 there is provided fixedly screen blade 13 so as to be located in front of shutter blade 12.

Gears 20, 21 are driven by control chain gear 7 and gear 21 meshes with gear 22 connected to axle 27. Gear lever 26 is connected rotatably to axle 27 and gearing train 23, 24, 25 meshes with gear 22.

Change-over operation member 29 to select normal and trick photography is supported slidably by the guide slot thereof and a pin provided on the camera body, and is operated manually by knob 28.

Markings are provided on knob 28, and their formation is arranged so as to allow the markings to align with the index "TRICK" on the camera body and the index "N" for denoting normal photography.

Figure 4:
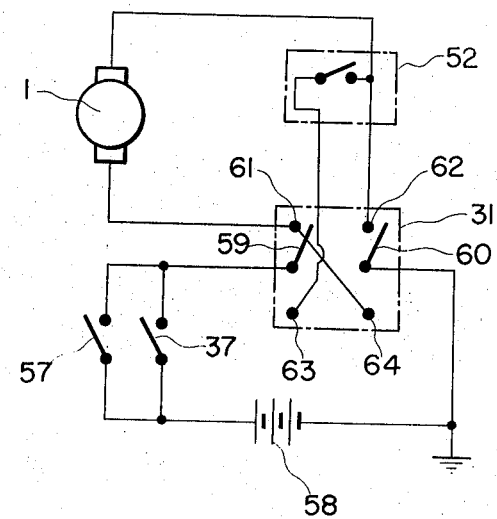
FIG. 4 is a schematic of an electric circuit used with the mechanism of the invention.

Reference numeral 54 denotes a lever for selecting either overlap photography, or continuous fade-out and fade-in photography, and when knob 56 thereof is indexed with instruction "$F_1$", end pin 55 of lever 54 is separated from contact piece 53 of switch 52 to close switch 52 so as to initiate the overlap photography. When knob 56 is indexed with instruction "$F_2$" end pin 55 of lever 54 pushes contact piece 53 to open switch 52 so as to initiate the fade-out and fade-in photography. As for change over switch 31, in FIG. 4, contacts 59, 60 are changed over to contacts 61, 62, 63, or 64, so that contacts 59, 60 have a normal spring-like tendency to engage with contacts 63, 64 for reversely rotating motor 1 and rewinding the film by means of power source 58. When change-over operation member 29 indicates "N" working protrusion 30 thereof engages with contacts 61, 62 to rotate motor 1 normally. Between power source 58 and change-over switch 31 there are provided in parallel with each other release switch 57, interlocking with the shutter release operation and keep up switch 37, interlocking with change-over operation member 29. And, in the reversing circuit of motor 1 switch 52 is provided in series, and when switch 52 is open the reverse rotation of motor 1 is stopped and accordingly the rewinding of the film is stopped.

Change-over switch 31 is arranged to be locked on the normal rotation side of the motor by means of lock lever 33 provided with spring 32. And, gear lever 26 is arranged to be pushed up to the position where it contacts stop pin 35 through the force of spring 34.

Gear 36 is mounted on rotary shaft 36' and meshes with gear 24 or 25 and has toothless portion 38. Gear 49 is also mounted on shaft 36' and performs a release operation after a time delay and is of a fan-shaped form so as to mesh with only gear 25. Gear 49 has a counter-clockwise turning tendency by means of weak spring 51, and the tip of arm 50 thereof is arranged to engage with and stop contact 53 of switch 52. Pin 39, provided fixedly on gear 36, fits in slit 41 provided on operation lever 40 to swing operation lever 40 in accordance with the movement of gear 36, using axle 42 as a center of rotation. Pin 43, projecting from the tip of operation lever 40 fits in slit 46 provided on sliding plate 45 which slides in guide shaft 44. Projection 47 of sliding plate 45 engages with notch 48 of sleeve 11 on cam ring 17 to slide sleeve 11 in the axial direction in accordance with the rotation of gear 36 so as to rotate main shaft 15 for actuating the fade-in and fade-out photography.

Switch 37 for interlocking with change-over operation member 29 is provided separately, and thereby the closing of the motor circuit is maintained by switch 37 regardless of the release operation when taking a trick photograph. However, it is also possible to arrange to control the closing of the motor circuit only by means of release switch 57 interlocking with the shutter release operation.

Since the present invention is formed as described above, when change-over operation member 29 is indexed in the "N" position, gear lever 26 which constitutes a clutch mechanism, is turned counter-clockwise by coil spring 34, and when gear 24 faces notch 38 of gear 36 the turning motion is not transmitted.

And as shown in FIG. 1 switch 37 is opened, and change-over switch 31 is in the position for rotating motor 1 normally and winding the film.

In this state, when the release button is pushed down, release switch 57 (not shown in FIG. 1) is closed, and motor 1 winds the film and rotates through the gear of sleeve 10 shutter blade 12 so as to effect the photograph. In this case, toothless portion 38 of gear 36 faces gear 24 so that gear 36 holds its position without turning, and pin 39 has stayed operation lever 40 in the counter-clockwise turning position, therefore sliding plate 45 stays in the right position on guide shaft 44 and at that time the position of cam ring 17 is arranged so that screen blade 13 may be phased with shutter blade 12. Thereby, normal photography is effected.

Just as the release button is released release switch 57 is opened and the photograph is stopped.

Next, when taking overlap photography, change over operation member 29 is slid so as to index with instruction "TRICK" and knob 56 is indexed with instruction "$F_1$."

By the above procedures the following operations are brought about.

1. By closing switch 37 or closing release switch 57, power source 58 is connected to motor 1.
2. By means of coil spring 34, gear lever 26 of the interlocking clutch is turned clockwise and gear 24 is separated therefrom, and gear 25 meshes with gear 36 and release gear 49 to turn both gears clockwise.
3. Through the clockwise turning of gear 36, pin 39 thereof turns operation lever 40 clockwise and moves sliding plate 45 to the left along guide shaft 44, and at the same time sleeve 11 slides on cam ring 17 to the left while the gear thereof meshes with shutter chain gear 6.
4. Cam pin 19 of sleeve 11 moves within cam slot 18 to change the phase relation between them.
5. Therefore, the phase relation between main shaft 15 fixed to cam ring 17 and sleeve 10 meshed with shutter chain gear 6 undergoes a change. Shutter blade 12 and screen blade 13 get out of phase with one another to effect fade-out photography.
6. When both blades 12, 13 get out of phase thoroughly with one another and incoming light rays are screened, notch portion 38 of gear 36 faces gear 25 and rotative movement is stopped.
7. The tip of arm 50 of gear 49 still meshing with gear 25 pushes lock lever 33 to disengage from switch 31 and close switch 31 to reverse the motor direction.
8. Switch 52 is closed and also switch 37 or release switch 57 is closed so that motor 1 starts automatically to turn in the reverse direction, gears 20, 25 turn in the opposite direction of the arrow in the Figures and, gear 49 turns counter-clockwise. The tip of arm 50 engages with contact 53 to open switch 52 so that the turning of motor 1 is stopped and the film is rewound by the predetermined length.

Next, when change-over operation member 29 is moved to index with instruction "N" gear 24 meshes again with gear 36 and switch 31 is closed for the normal turning of the motor by being pushed by pin 30. Switch 37 is opened, and thus the preparation for fade-in photography is finished.

Then, upon pushing the release button gear 24 turns in the direction shown by the arrow, gear 36 turns counter-clockwise, shutter blade 12 and screen blade 13 change phase so as to be aligned with one another, and thus fade-in photography is effected by overlap. Next, as notch portion 38 of gear 36 faces gear 24 they disengage from each other and screen blade 13 is fully opened, and thereafter normal photography is effected.

Then, when taking fade-out and fade-in photography continuously without overlapping change-over operation member 29 is slid to index with instruction "TRICK" and knob 56 is indexed with instruction "$F_2$."

Figure 2:
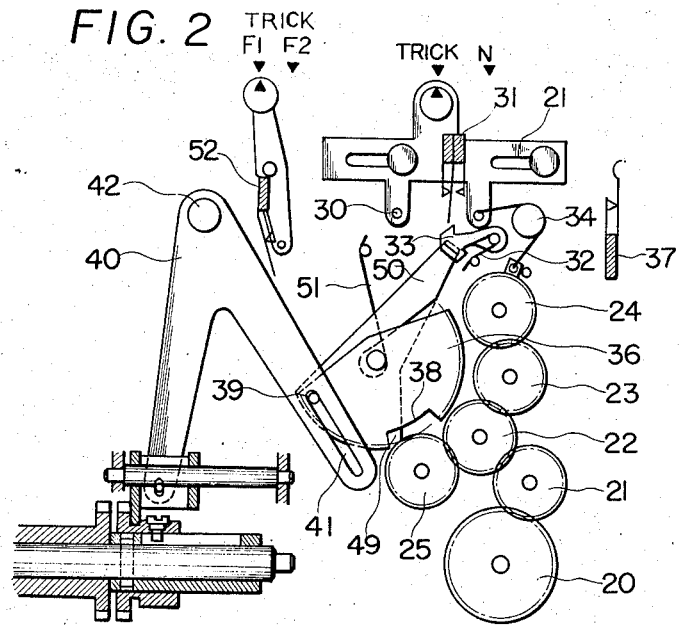
FIG. 2 is a partially cut away side view of certain essential elements of the mechanism shown in FIG. 1 subsequent to the termination of trick photography and fade-out photography.
Figure 3:
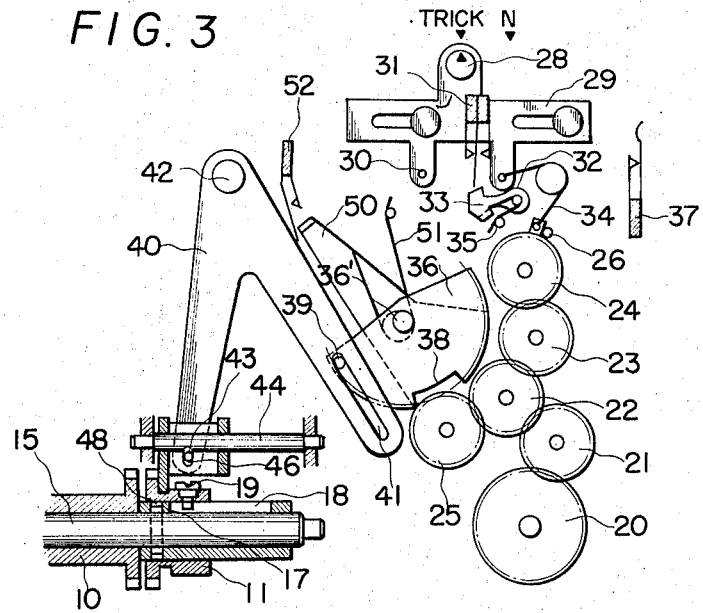
FIG. 3 is a partially cut away side view of certain essential elements of the mechanism changed-over to overlap photography and the rewinding of the film is terminated.

In this manner, pin 55 opens switch 52, which is inserted in series in the reversing circuit of motor 1, by pushing contact 53, so that because of the operations mentioned in items from (1) to (7) above, fade-out photography is finished. When the components are as shown in FIG. 2, even though switch 31 is closed for the reverse operating motor 1 is stopped so that the rewinding of the film is not effected.

Next, upon moving change over operation member 29 to index with instruction "N," because of the aforementioned operations the subsequent fade-in photography is continuously effected.

Since the present invention can be operated as described above, overlap and continuous fade-out and fade-in photography (with or without overlap) can be effected very easily, and yet by means of the release gear for determining time control, the fade-out film length, rewind film length, and the fade-in film length can be automatically selected equally so that the exact overlap photograph can be effected as well.

I claim:
1. In a motor driven motion picture camera apparatus for controlling fade-in and fade-out photography, comprising:
- a driving motor movable in a normal and a reverse direction;
- a first energizing circuit for driving said motor in said normal direction;
- a second energizing circuit for driving said motor in said reverse direction, said second circuit including a switch contact to open and close said second energizing circuit;
- a change over switch for selectively connecting either of said first and second energizing circuits to said motor and biased to connect said second circuit;
- a first member manually settable to either a normal position for restraining said change over switch in said first circuit selecting condition or a fade position enabling said change over switch to select said second energizing circuit;
- a lock member for restraining said change over switch in said first circuit selecting condition;
- a second member manually settable to either a first position for closing said switch contact or a second position for opening said switch contact;
- a shutter blade member movable to positions between a closed condition and a fully open condition;
- a control member for controlling the opening of said shutter blade member as a function of a position thereof, and movable in a first direction for decreasing the opening and a second direction for increasing the opening;
- means for transmitting movement of said motor to said control member and including an intermediate means for changing the directional rotational relationship between said driving motor and said control member in response to the setting of said first manual member, said control member being disengageable from said means for transmitting movement after it is driven for a predetermined amount in either said first or second directions; and
- an operating member driven from a rest position to an operating position for releasing said locking member with the movement of said control member in said first direction.

2. A control apparatus as set forth in claim 1, wherein said intermediate member includes first and second gears rotatable in opposite directions and alternatively engageable with said control member in response to the setting of said first manual member.

3. A control apparatus as set forth in claim 1, further comprising a power source common to said first and second energizing circuits, and a pair of parallelly connected switch contacts for connecting said change over switch to said power source, and one of said parallelly connected switch contacts being closed when said first manual member is in said fade position.

* * * * *